(12) United States Patent
Lai

(10) Patent No.: US 11,466,689 B1
(45) Date of Patent: Oct. 11, 2022

(54) FUEL PUMP

(71) Applicant: ZHONGSHAN PEILI TECHNOLOGY CO., LTD., Zhongshan (CN)

(72) Inventor: Chunlai Lai, Ruijin (CN)

(73) Assignee: ZHONGSHAN PEILI TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 17/829,459

(22) Filed: Jun. 1, 2022

(51) Int. Cl.
| | |
|---|---|
| *F04D 3/00* | (2006.01) |
| *F04D 29/08* | (2006.01) |
| *F02M 37/08* | (2006.01) |
| *F04D 29/40* | (2006.01) |
| *F04D 29/52* | (2006.01) |

(52) U.S. Cl.
CPC ............... *F04D 3/005* (2013.01); *F04D 3/00* (2013.01); *F04D 29/086* (2013.01); *F02M 37/08* (2013.01); *F04D 29/406* (2013.01); *F04D 29/528* (2013.01)

(58) Field of Classification Search
CPC .......... F04D 29/406; F04D 3/00; F04D 3/005; F04D 29/086; F04D 29/528
See application file for complete search history.

(56) References Cited

U.S. PATENT DOCUMENTS

| | | | | |
|---|---|---|---|---|
| 4,570,833 | A * | 2/1986 | Vanderjagt | ............ F04B 53/106 417/269 |
| 6,063,634 | A * | 5/2000 | Chomka | ................. G01F 23/18 422/106 |
| 2017/0152848 | A1* | 6/2017 | Turczak | ................. F04B 17/06 |
| 2019/0249674 | A1* | 8/2019 | Wang | ................. F04D 15/0005 |

* cited by examiner

*Primary Examiner* — Connor J Tremarche
(74) *Attorney, Agent, or Firm* — Daniel M. Cohn; Howard M. Cohn

(57) ABSTRACT

A fuel pump includes a control box, a pump body, and a gun nozzle. A motor housing is fixedly connected to an inner wall of the pump body, a motor is disposed in the motor housing. A first sealing mechanism is disposed between a first side of the motor housing and an output shaft of the motor. A second sealing mechanism is disposed between a second side of the motor housing and a power line of the motor. An impeller is fixedly connected to one end of the output shaft of the motor. One end of the pump body is fixedly connected to a pressure chamber, and a liquid inlet is defined on one side of the pressure chamber and a liquid outlet is defined on one side of the pump body, where the one side of the pressure chamber faces away from the one side of the pump body.

8 Claims, 4 Drawing Sheets

FUEL PUMP

TECHNICAL FIELD

The present disclosure relates to a technical field of fuel pumps, and in particular to a fuel pump having multipurpose.

BACKGROUND

Fuel pumps are a kind of pumps which are portable and compact, and have three major types of in-line type, distributor type, and single type. The fuel pumps need a power source to operate, and a camshaft at a lower portion of the fuel pumps is driven through an engine crankshaft gear. The fuel pumps are suitable for conveying various fuels, such as heavy fuel, diesel fuel, and lubricating fuel, and the fuel pumps are provided with copper gears to convey liquid whose boiling points are low, such as gasoline, benzene, etc.

The present disclosure relates to a fuel pump. Present fuel pumps are single in power supply mode, which causes significant limitations. Further, an infrared sensor switch of a fuel outlet of the present fuel pumps is disposed in the fuel outlet, and liquid is easy to flow to a position where a head of the infrared sensor locates to generate mistakenly touching and shutdown when flowing. In addition, there is no indicator light on a key switch, so that whether a motor of the fuel pump works or not cannot be quickly determined since whether the key switch is turned on or off cannot be indicated, which is inconvenient to operate. The motor is disposed in the liquid, so that the whole motor needs to be sealed. However, a present structure of the motor is that a cylindrical surface of a housing of the motor is sealed, a force of which is not on a same acting force surface of a force for compressing and sealing. Moreover, a sealing area of the present structure of the motor is small, so that the motor easily fails to be sealed, which results in a risk of liquid leakage in the motor.

SUMMARY

The present disclosure aims to solve technical problems in prior art, and provides a fuel pump.

In order to achieve above aims, the present disclosure provides a fuel pump, including a control box, a pump body, and a gun nozzle. A motor housing is fixedly connected to an inner wall of the pump body, a motor is disposed in the motor housing. A first sealing mechanism is disposed between a first side of the motor housing and an output shaft of the motor. A second sealing mechanism is disposed between a second side of the motor housing and a power line of the motor. An impeller is fixedly connected to one end of the output shaft of the motor. One end of the pump body is fixedly connected to a pressure chamber, and a liquid inlet is defined on one side of the pressure chamber and a liquid outlet is defined on one side of the pump body, where the one side of the pressure chamber faces away from the one side of the pump body. An adapter is disposed in the control box in a penetrating manner. An exhaust valve is embedded in an outer surface of the adapter. A first pipeline is fixedly connected between a first end of the adapter and the liquid outlet of the pump body. A second pipeline is fixedly connected between a second end of the adapter and the gun nozzle. A control mechanism is embedded on an outer surface of the control box. A mounting pipe is disposed on one side of an inner wall of an output end of the gun nozzle. An infrared sensor and a printed circuit board (PCB) are embedded in the mounting pipe.

Furthermore, the first sealing mechanism includes a gland, and the gland is embedded and clamped in the motor housing. A snap-fit position matched with the gland is defined on an inner wall of the motor housing. The output shaft of the motor is rotatably connected to a motor shaft seal, where the motor shaft seal is sleeved on the output shaft of the motor, and the motor shaft seal is embedded in the gland. A rubber sealing component is disposed between the gland and the motor housing.

Furthermore, the second sealing mechanism includes a rubber component. A sealing portion is disposed at one end of the motor housing. One end of the rubber component penetrates through the sealing portion and is clamped with an inner wall of the sealing portion. A sealing hole matched with the power line of the motor is defined on an outer surface of the rubber component. An outer wall of the power line of the motor is fixedly connected to an inner wall of the sealing hole.

Furthermore, the exhaust valve includes a valve body embedded on a first side of the adapter. An air channel is defined in the valve body, a steel ball is disposed in the air channel, an interior of the adapter is communicated with the air channel, and a side wall sealing component is embedded in a second side of the adapter in the penetrating manner.

Furthermore, the first pipeline includes a first corrugated pipe. First movable joints are fixedly connected to two ends of the first corrugated pipe. The first movable joints are respectively connected to the liquid outlet of the pump body and an input end of the adapter.

Furthermore, the second pipeline includes a second corrugated pipe. Second movable joints are fixedly connected to two ends of the second corrugated pipe. The second movable joints are respectively connected to an output end of the adapter and an input end of the gun nozzle.

Furthermore, the control mechanism includes a control panel, and the control panel is embedded on the outer surface of the control box. Control switches and an indication lamp are sequentially embedded on an outer surface of the control panel. A direct current (DC) socket is embedded in one side of the outer surface of the control box, and dry battery is disposed in the control box.

Furthermore, a PCB controller is disposed in the control box. The infrared sensor, the PCB, and the motor are all electrically connected to a control circuit board.

Beneficial effects of the present disclosure are as following.

The fuel pump of the present disclosure provides the first sealing mechanism and the second sealing mechanism and adopts end face and radial seal for the output shaft of the motor, so that a compression force of a fuel pressure and a compression force of the gland are in a same direction. a sealing surface is always under an action of compression forces, and sealing performance of the motor is further improved. The fuel pump of the present disclosure further provides the indication lamp, whether the motor works or not can may be clearly determined through the indication lamp, the infrared sensor is disposed on an outer side of a flow channel, and the infrared sensor is not in direct contact with the liquid, which avoids misjudgment responses.

Reference number in drawings: 1. control box; 2. pump body; 3. motor housing; 4. motor; 5. impeller; 6. pressure chamber; 7. liquid inlet; 8. liquid outlet; 9. adapter; 10. valve body; 11. steel ball; 12. gland; 13. motor shaft seal; 14. rubber sealing component; 15. sealing portion; 16. rubber component; 17. sealing hole; 18. side wall sealing component; 19. first corrugated pipe; 20. first movable joints; 21. second corrugated pipe; 22. second movable joints; 23. gun nozzle; 24. control panel; 25. control switches; 26. indication lamp; 27. mounting pipe; 28. infrared sensor; and 29. DC socket.

DETAILED DESCRIPTION

Figure 1:
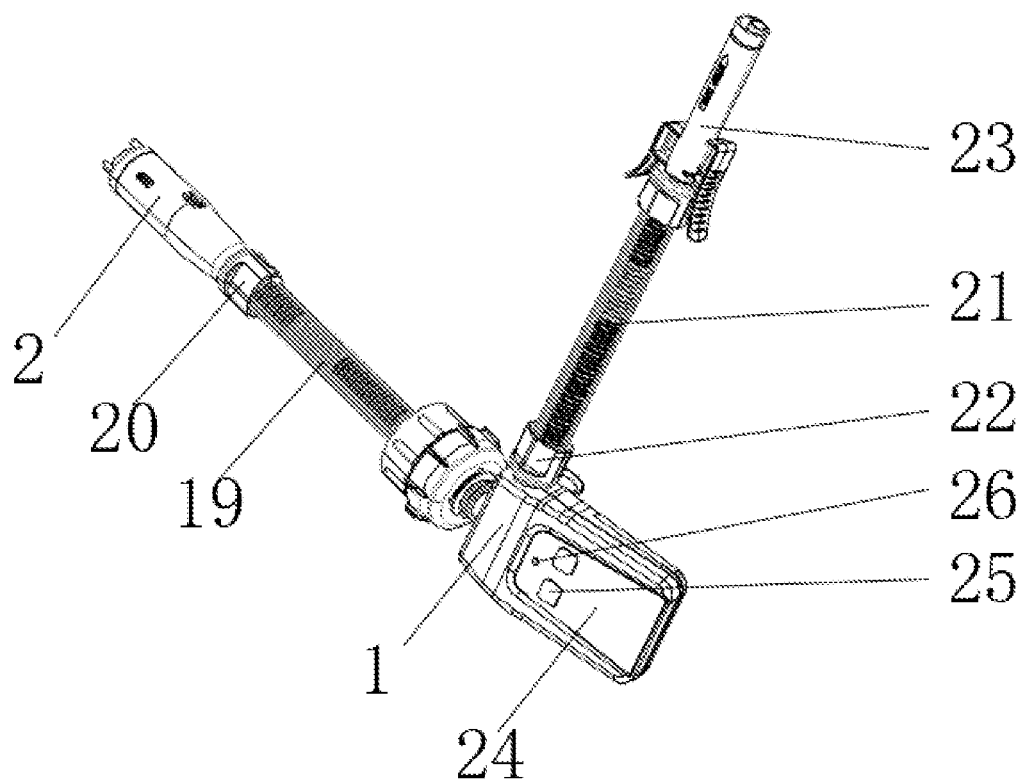
FIG. 1 is an overall structural schematic diagram of a fuel pump according to one embodiment of the present disclosure.
Figure 2:
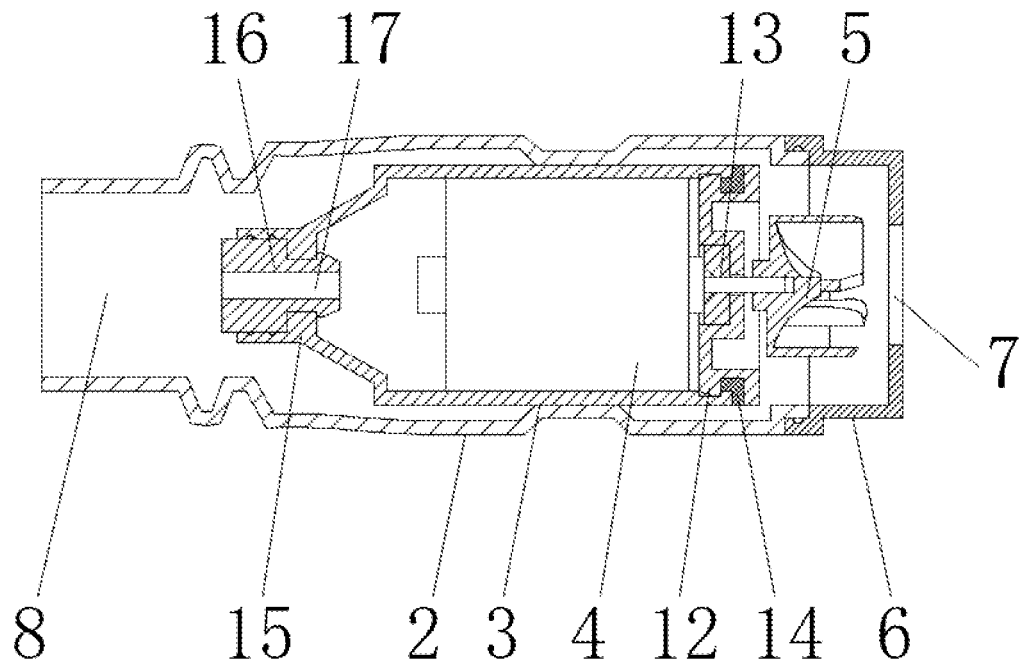
FIG. 2 is a cross-sectional schematic diagram of a pump body according to one embodiment of the present disclosure.
Figure 3:
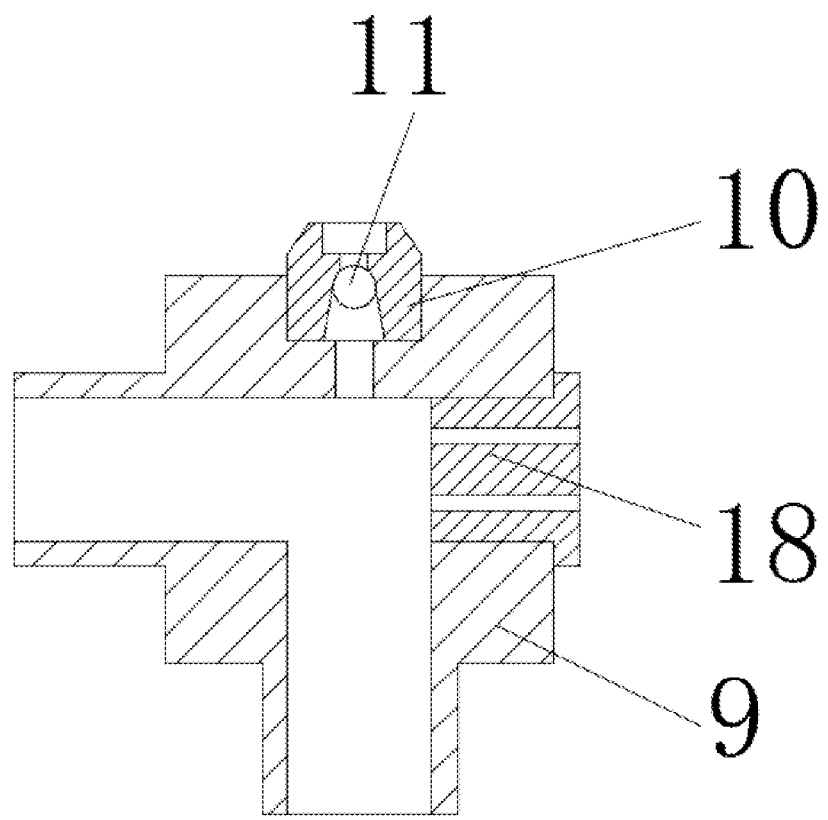
FIG. 3 is an internal structural schematic diagram of an adapter according to one embodiment of the present disclosure.
Figure 4:
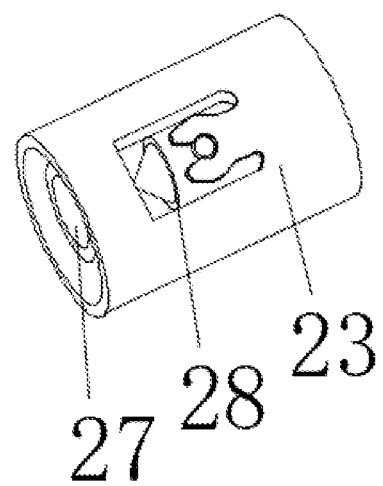
FIG. 4 is a schematic diagram of an assembly structure of an infrared sensor according to one embodiment of the present disclosure.
Figure 5:
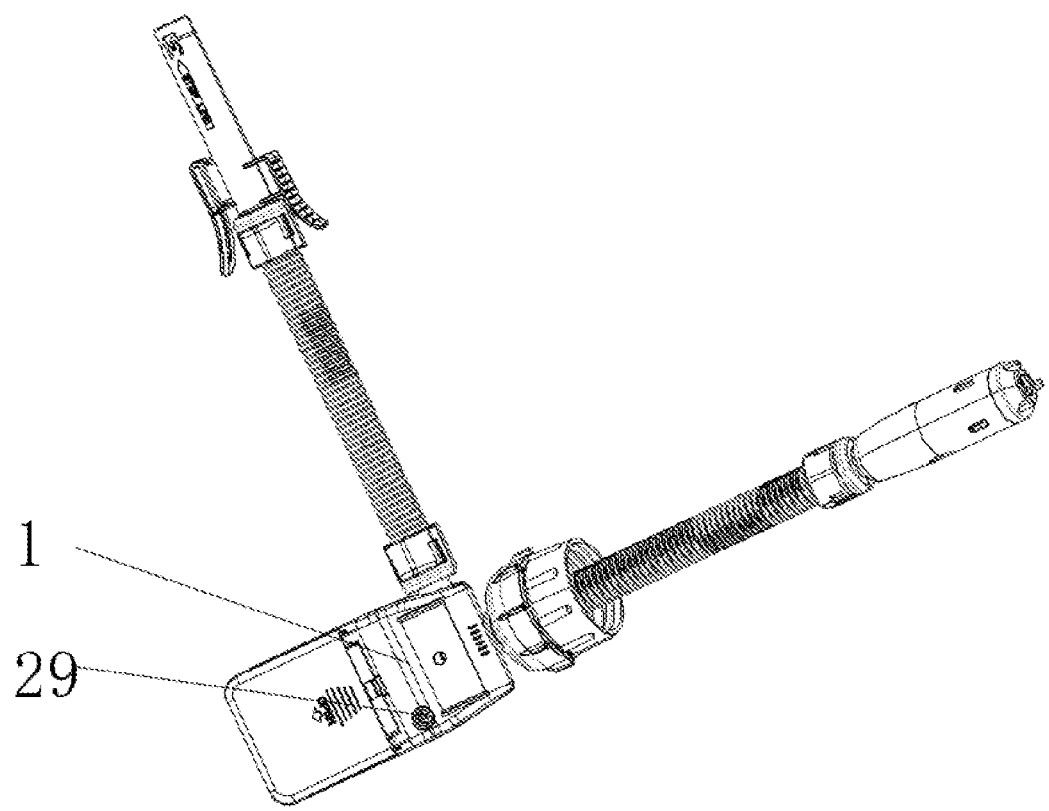
FIG. 5 is a schematic diagram of a rear view of the fuel pump according to one embodiment of the present disclosure.
Figure 6:
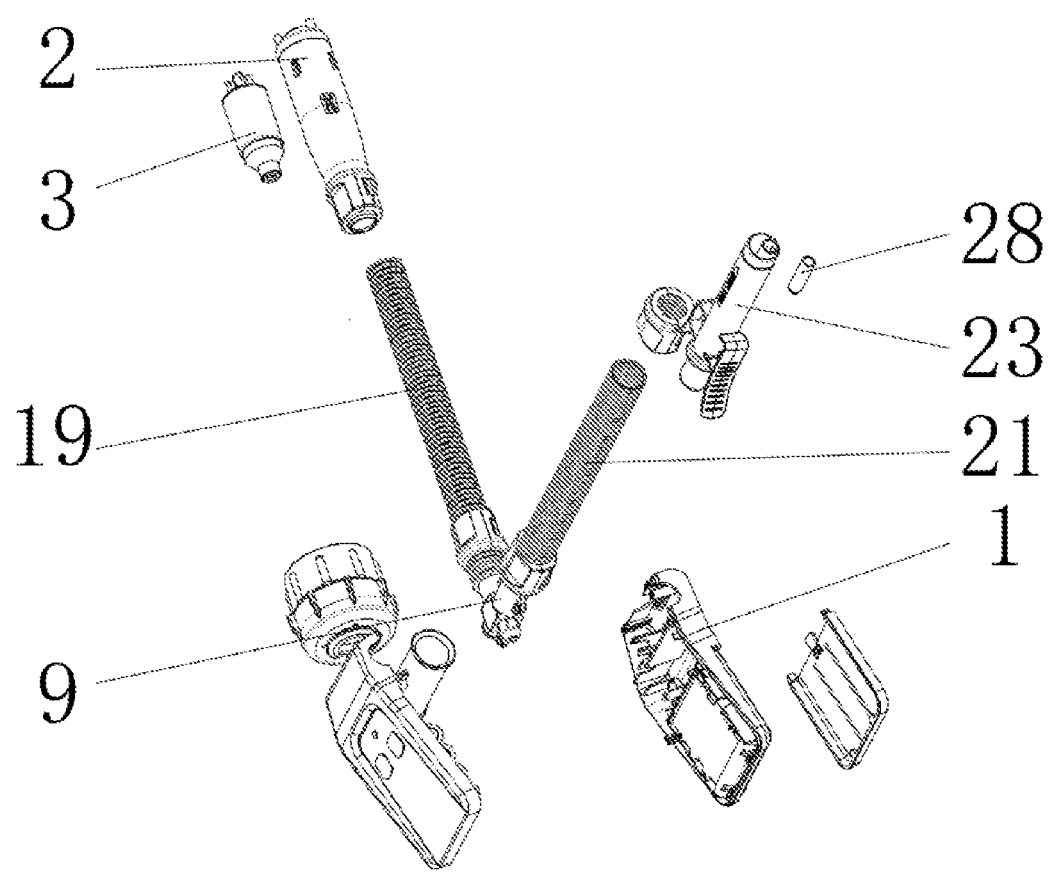
FIG. 6 is an exploded schematic diagram according to one embodiment of the present disclosure.

As shown in FIGS. 1-6, the present disclosure provides a fuel pump, including a control box 1, a pump body 2, and a gun nozzle 23. A motor housing 3 is fixedly connected to an inner wall of the pump body 2. A motor 4 is disposed at a high position inside the motor housing 3. A first sealing mechanism is disposed between a first side of the motor housing 3 and an output shaft of the motor 4. A second sealing mechanism is disposed between a second side of the motor housing 3 and a power line of the motor 4. An impeller 5 is fixedly connected to one end of the output shaft of the motor 4. One end of the pump body 2 is fixedly connected to a pressure chamber 6. A liquid inlet 7 is defined on one side of the pressure chamber 6 and a liquid outlet 8 is defined on one side of the pump body 2, where the one side of the pressure chamber 6 faces away from the one side of the pump body 2. An adapter 9 is disposed in the control box 1 in a penetrating manner. An exhaust valve is embedded in an outer surface of the adapter 9. A first pipeline is fixedly connected between a first end of the adapter 9 and the liquid outlet 8 of the pump body 2. A second pipeline is fixedly connected between a second end of the adapter 9 and the gun nozzle 23. A control mechanism is embedded on an outer surface of the control box 1. A mounting pipe 27 is disposed on one side of an inner wall of an output end of the gun nozzle 23. An infrared sensor 28 and a printed circuit board (PCB) are embedded in the mounting pipe 27. The infrared sensor 28 is disposed on an outside of a flow channel, and the infrared sensor 28 is not in direct contact with the liquid, which avoids misjudgment responses.

The first sealing mechanism includes a gland 12, and the gland 12 is embedded and clamped in the motor housing 3. A snap-fit position matched with the gland 12 is defined on an inner wall of the motor housing 3. An output shaft of the motor 4 is rotatably connected to a motor shaft seal 13, where the motor shaft seal 13 is sleeved on the output shaft of the motor 4, and the motor shaft seal 13 is embedded in the gland 12. A rubber sealing component 14 is disposed between the gland 12 and the motor housing 3. The output shaft of the motor 4 adopts end face and radial seal, a compression force of a fuel pressure and a compression force of the gland are in a same direction, so that a sealing surface is always under an action of compression forces, and the present disclosure uses tiny ribs for sealing, which is firm and reliable and not easy to loosen.

The second sealing mechanism includes a rubber component 16. A sealing portion 15 is disposed at one end of the motor housing 3. One end of the rubber component 16 penetrates through the sealing portion 15 and is clamped with an inner wall of the sealing portion 15. A sealing hole 17 matched with the power line of the motor 4 is defined on an outer surface of the rubber component 16, and an outer wall of the power line of the motor 4 is fixedly connected to an inner wall of the sealing hole 17, which improves sealing performance at the power line of the motor 4.

The exhaust valve includes a valve body 10 embedded on a first side of the adapter 9. An air channel is defined in the valve body 10. A steel ball 11 is disposed in the air channel. An interior of the adapter 9 is communicated with the air channel. A side wall sealing component 18 is embedded in a second side of the adapter 9 in the penetrating manner. The exhaust valve is configured to prevent siphoning and provides the steel ball which is stainless. The steel ball freely moves in the valve body 10 under an action of air pressure. The valve body 10 and the steel ball are sealed through spherically attaching with each other, so that a risk of fuel leakage is reduced. The exhaust valve is disposed in an isolated cavity, and the cavity is communicated with an outside world through an exhaust hole. Even if there is fuel leakage, the leaked fuel may be discharged through the exhaust hole. A wiring hole is defined in the side wall sealing component 18 through the penetrating manner.

The first pipeline includes a first corrugated pipe 19. First movable joints 20 are fixedly connected to two ends of the first corrugated pipe 19. The first movable joints 20 are respectively connected to the liquid outlet 8 of the pump body 2 and an input end of the adapter 9. The first movable joints 20 are convenient for assembling and disassembling the first corrugated pipe 19. A length of the first corrugated pipe 19 is not limited herein, and may be made in any length to meet market demands of different lengths.

The second pipeline includes a second corrugated pipe 21. second movable joints 22 are fixedly connected to two ends of the second corrugated pipe 21. The second movable joints 22 are respectively connected to an output end of the adapter 9 and an input end of the gun nozzle 23. The second movable joints 22 are convenient for assembling and disassembling the second corrugated pipe 21. A length of the second corrugated pipe 21 is not limited herein, and may be made in any length to meet market demands of different lengths.

The control mechanism includes a control panel 24, and the control panel 24 is embedded on the outer surface of the control box 1. Control switches 25 and an indication lamp 26 are sequentially embedded on an outer surface of the control panel 24. A direct current (DC) socket 29 is embedded in one side of the outer surface of the control box 1, and a dry battery is disposed in the control box 1. The indication lamp 26 is disposed next to the control switches 25, which is configured to clearly determine whether the motor works or not. In addition, the DC socket 29 may be connected to an external power adapter for power supply, and may further be connected to an external battery for power supply through a wire clip, which is more applicable.

A PCB controller is disposed in the control box 1. The infrared sensor 28, the PCB, and the motor 4 are all electrically connected to a control circuit board, so as to avoid manual operation and overflow of the liquid, and realize a function of automatic stop.

When using the fuel pump, the output shaft of the motor 4 adopts end face and radial seal through the first sealing mechanism, the compression force of the fuel pressure and the compression force of the gland are in the same direction, so that the sealing surface is always under the action of compression forces, and the tiny ribs are used for sealing, which is firm and reliable and not easy to loosen. The second sealing mechanism improves the sealing performance at the power line of the motor 4. The indication lamp 26 is disposed next to the control switches 25, which is configured to clearly determine whether the motor works or not. The infrared sensor 28 is disposed on an outside of a flow channel, and the infrared sensor 28 is not in direct contact with the liquid, which avoids misjudgment responses. Plastic covering the infrared sensor 28 and the control switches 25 is a specified material for infrared transmission, so that influence of surrounding objects and stray light on the infrared sensor 28 and the control switches 25 is relatively small, thereby avoiding misjudgment responses of the control switches 25. The first movable joints 20 and the second movable joints 22 are convenient for assembling and disassembling the first corrugated pipe 19 and the second corrugated pipe 21. Lengths of the corrugated pipes are not limited herein, and may be made in any length to meet market demands of different lengths. The DC socket 29 may be connected to an external power adapter for power supply, and may further be connected to an external battery for power supply through a wire clip, which is more applicable. The exhaust valve is configured to prevent siphoning and provides the steel ball which is stainless to be hard. A sealing portion of the valve body 10 is designed to be spherical to match with the steel ball, thereby achieving better spherically attaching for sealing and reducing a risk of the fuel leakage. The exhaust valve is disposed in the isolated cavity, when the fuel pump starts to pump liquid, the steel ball 11 is driven to go upwards through pressure, so that a spherical surface of the steel ball 11 is tightly attached to a top portion of the air channel inside the valve body 10 to achieve a sealing effect. When the fuel pump stops working, the steel ball 11 falls due to its own weight to keep air unobstructed, thereby ensuring that the air enters a liquid inlet channel and then blocks the liquid inlet channel and further avoiding a siphon phenomenon. Siphoning may cause the liquid to stop after infrared rays are turned off.

The above description is merely preferred embodiments of the present disclosure, which is not intended to limit the present disclosure. Any modification, equivalent replacement, improvement, etc. made within spirit and principle of the present disclosure shall be included in a protection scope of the present disclosure.

What is claimed is:

1. A fuel pump, comprising:
a control box;
a pump body; and
a gun nozzle;
wherein a motor housing is fixedly connected to an inner wall of the pump body, a motor is disposed in the motor housing, a first sealing mechanism is disposed between a first side of the motor housing and an output shaft of the motor, a second sealing mechanism is disposed between a second side of the motor housing and a power line of the motor; an impeller is fixedly connected to one end of the output shaft of the motor, one end of the pump body is fixedly connected to a pressure chamber, and a liquid inlet is defined on one side of the pressure chamber and a liquid outlet is defined on one side of the pump body, where the one side of the pressure chamber faces away from the one side of the pump body; an adapter is disposed in the control box in a penetrating manner, an exhaust valve is embedded in an outer surface of the adapter, a first pipeline is fixedly connected between a first end of the adapter and the liquid outlet of the pump body, a second pipeline is fixedly connected between a second end of the adapter and the gun nozzle, a control mechanism is embedded on an outer surface of the control box, a mounting pipe is disposed on one side of an inner wall of an output end of the gun nozzle, and an infrared sensor and a printed circuit board (PCB) are embedded in the mounting pipe.

2. The fuel pump according to claim 1, wherein the first sealing mechanism comprises a gland, the gland is embedded and clamped in the motor housing, a snap-fit position matched with the gland is defined on an inner wall of the motor housing, the output shaft of the motor is rotatably connected to a motor shaft seal, where the motor shaft seal is sleeved on the output shaft of the motor; the motor shaft seal is embedded in the gland, and a rubber sealing component is disposed between the gland and the motor housing.

3. The fuel pump according to claim 1, wherein the second sealing mechanism comprises a rubber component, a sealing portion is disposed at one end of the motor housing, one end of the rubber component penetrates through the sealing portion and is clamped with an inner wall of the sealing portion, a sealing hole matched with the power line of the motor is defined on an outer surface of the rubber component, and an outer wall of the power line of the motor is fixedly connected to an inner wall of the sealing hole.

4. The fuel pump according to claim 1, wherein the exhaust valve comprises a valve body embedded on a first side of the adapter, an air channel is defined in the valve body, a steel ball is disposed in the air channel, an interior of the adapter is communicated with the air channel, and a side wall sealing component is embedded in a second side of the adapter in the penetrating manner.

5. The fuel pump according to claim 1, wherein the first pipeline comprises a first corrugated pipe, first movable joints are fixedly connected to two ends of the first corrugated pipe, and the first movable joints are respectively connected to the liquid outlet of the pump body and an input end of the adapter.

6. The fuel pump according to claim 1, wherein the second pipeline comprises a second corrugated pipe, second movable joints are fixedly connected to two ends of the second corrugated pipe, the second movable joints are respectively connected to an output end of the adapter and an input end of the gun nozzle.

7. The fuel pump according to claim 1, wherein the control mechanism comprises a control panel, the control panel is embedded on the outer surface of the control box, control switches and an indication lamp are sequentially embedded on an outer surface of the control panel, a direct current (DC) socket is embedded in one side of the outer surface of the control box, and a dry battery is disposed in the control box.

8. The fuel pump according to claim 7, wherein a PCB controller is disposed in the control box; and the infrared sensor, the PCB, and the motor are all electrically connected to a control circuit board.

* * * * *